(12) United States Patent
Falossi et al.

(10) Patent No.: US 11,192,582 B2
(45) Date of Patent: Dec. 7, 2021

(54) LIGHTWEIGHT SUSPENSION UPRIGHT OR KNUCKLE

(71) Applicants: Aktiebolaget SKF, Gothenburg (SE); SKF Aerospace France S.A.S, Montigny-le-Bretonneux (FR)

(72) Inventors: Marco Falossi, San Raffaele Cimena (IT); Remi Sarlin, Allex (FR); Michiel Warmerdam, Loenen (NL)

(73) Assignees: SKF AEROSPACE FRANCE S.A.S.; AKTIEBOLGET SKF

( * ) Notice: Subject to any disclaimer, the term of this patent is extended or adjusted under 35 U.S.C. 154(b) by 77 days.

(21) Appl. No.: 16/527,312

(22) Filed: Jul. 31, 2019

(65) Prior Publication Data

US 2020/0047796 A1    Feb. 13, 2020

(30) Foreign Application Priority Data

Aug. 8, 2018    (IT) .......................... 102018000007978

(51) Int. Cl.
*B62D 7/18*    (2006.01)
*B60B 27/00*    (2006.01)
(Continued)

(52) U.S. Cl.
CPC ............ *B62D 7/18* (2013.01); *B60B 27/0094* (2013.01); *B60B 27/065* (2013.01); *B60G 3/01* (2013.01); *B60G 2206/7101* (2013.01)

(58) Field of Classification Search
CPC ..... B62D 7/18; B60B 27/0094; B60B 27/065; B60G 3/01; B60G 2206/7101; B60G 2206/50
See application file for complete search history.

(56) References Cited

U.S. PATENT DOCUMENTS

| 5,788,263 A | 8/1998 | VanDenberg |
| 6,398,240 B1 * | 6/2002 | Taylor ...................... B60G 3/18 280/93.511 |

(Continued)

FOREIGN PATENT DOCUMENTS

| DE | 102007053120 | 11/2007 |
| DE | 102015212112 | 6/2015 |

(Continued)

OTHER PUBLICATIONS

US 5,778,263 A, 08/1998, VanDenberg (withdrawn)

(Continued)

*Primary Examiner* — Paul N Dickson
*Assistant Examiner* — Daniel M. Keck
(74) *Attorney, Agent, or Firm* — Reed Smith LLP (57) ABSTRACT

A lightweight suspension upright or knuckle including: a bearing connection interface having a first sleeve element and a second, radially outer, sleeve element and further including a BMC/LFT/DLFT annular body; at least one attachment interface configured to connect the suspension upright or knuckle to a respective control or support element; and a supporting structural body mechanically connecting the bearing connection interface with the at least one attachment interface. The supporting structural body is shaped as a reticular frame including first blade elements chemically and mechanically interconnected to each other and to the outer lateral surface; each blade element consisting in one or more mats or plies of continuous fibers embedded in a polymer matrix, stacked onto one another and that have been compression molded together and with the annular body. Also, a method for obtaining a lightweight suspension upright or knuckle for a vehicle providing a bearing connection interface.

9 Claims, 4 Drawing Sheets

(51) Int. Cl.
*B60B 27/06* (2006.01)
*B60G 3/01* (2006.01)
*B29C 70/86* (2006.01)
*B29C 53/56* (2006.01)

(56) References Cited

U.S. PATENT DOCUMENTS

| | | | |
|---|---|---|---|
| 9,751,559 B2* | 9/2017 | Maruyama | B62D 7/18 |
| 10,744,834 B2* | 8/2020 | Ubaldo | B60G 7/02 |
| 2003/0010412 A1* | 1/2003 | Matsumoto | C22C 21/02 |
| | | | 148/552 |
| 2016/0121926 A1 | 5/2016 | Peters et al. | |
| 2016/0121927 A1 | 5/2016 | Schaake et al. | |
| 2017/0008558 A1 | 1/2017 | Kruger et al. | |
| 2017/0210187 A1 | 7/2017 | Meyer et al. | |
| 2017/0210418 A1* | 7/2017 | Sakuma | B62D 7/18 |
| 2019/0256135 A1* | 8/2019 | Kwon | B29C 70/58 |
| 2019/0283497 A1* | 9/2019 | Sinka | B60B 27/0073 |

FOREIGN PATENT DOCUMENTS

| | | | | |
|---|---|---|---|---|
| EP | 1070604 | | 1/2001 | |
| EP | 3003824 | | 4/2016 | |
| EP | 3409513 | A1 * | 12/2018 | B60G 15/07 |
| FR | 2969237 | A1 * | 6/2012 | F16C 33/768 |
| IN | 1187CHN2014 | | 4/2015 | |
| KR | 20130022152 | | 3/2013 | |
| KR | 101549915 | | 6/2015 | |
| KR | 101549916 | | 9/2015 | |
| KR | 101607247 | | 9/2015 | |
| WO | 2005051624 | | 6/2005 | |
| WO | 2015106990 | | 7/2015 | |

OTHER PUBLICATIONS

International Search Report for Italy Patent Application No. 201800007978.

Feraboli, et al., Lamborghini "Forged Composite" Technology for the Suspension Arms of the Sesto Elemento; pp. 1-13; 2011.

Composite-Lightweight Rear Suspension Knuckle for a High Volume Passenger Vehicle; pp. 1-4; 2017.

Eickhoff, et al., Development of a Fiber-Composite Suspension Strut/Knuckle Module; pp. 267-280; 2010.

* cited by examiner

LIGHTWEIGHT SUSPENSION UPRIGHT OR KNUCKLE

CROSS-REFERENCE TO RELATED APPLICATIONS

This application claims priority to Italian patent application no. 102018000007978 filed on Aug. 8, 2018, the contents of which are fully incorporated herein by reference.

FIELD OF THE INVENTION

The present invention concerns a lightweight suspension upright or knuckle, in particular a steering knuckle, for a vehicle, the lightweight suspension upright or knuckle integrating a wheel hub bearing module.

BACKGROUND OF THE INVENTION

As it is known, e.g. from US2016121927A1, in the interests of fuel economy there is an increasing drive within the automotive industry towards weight reduction of the component parts of vehicles. One such component is the steering knuckle, which connects the wheel bearing to the vehicle suspension and, more in general, such components include all the uprights of the vehicle suspension. Typically, uprights and steering knuckles are made of cast iron or of a light alloy and there is still potential for weight savings by manufacturing the knuckle/upright from a more lightweight material, such as fiber-reinforced polymer.

However, a problem there exists in joining the wheel bearing to the composite material of the 201 upright/knuckle. Another problem is that is rather difficult to deploy continuous fibers into a composite material in a part like a vehicle knuckle due to the geometrical complexity of the part, having branches in different directions, and due to the complex loading conditions.

According to US2016121927A1 a whole steering knuckle composite body comprising a fiber-reinforced polymeric material is overmolded onto a sleeve element acting as a bearing connection interface and consisting of the outer ring of the rolling bearing unit constituting the wheel hub, or of a metal ring designed to be connected with the rolling bearing.

The fiber-reinforced material comprises a long-fiber molding compound that is overmolded to a first joining surface on the sleeve element, whereby the first joining surface is a radially outer surface of the sleeve element. In addition, the first joining surface is provided with a recessed portion into which the long-fiber molding compound flows, for mechanically locking the sleeve element to the composite body in an axial direction.

However, to mold a whole knuckle body (or a whole suspension upright) onto a rolling bearing, or anyway even onto a connection interface consisting of a metal sleeve, may be not a simple and cheap operation. Moreover, the transmission of forces between the bearing and the knuckle body may be not always optimized, in particular during cornering. Finally, the steering knuckle according to US2016121927A1, though lighter than a traditional metal alloy steering knuckle, may result to be still too heavy for the majority of the applications and, above all, in a waste of precious composite material, since at least a good part of it is not arranged in optimal manner to receive the working loads.

BRIEF SUMMARY OF THE INVENTION

The object of the present invention is to provide a suspension upright or knuckle, in particular a steering knuckle, for a vehicle, including a hub bearing unit and which is easy and economical to be manufactured, though ensuring an optimized transmission of forces between the hub bearing unit and the knuckle/upright body and a low weight.

According to the invention, a suspension upright or knuckle for a vehicle is therefore provided having the features described in the appended claims.

BRIEF DESCRIPTION OF THE SEVERAL VIEWS OF THE DRAWING

The invention will now be described with reference to the accompanying drawings, which illustrate a non-limiting embodiment thereof, in which.

DETAILED DESCRIPTION OF THE INVENTION

With reference to FIGS. 1, 2, 3 and 9, the number 1 indicates as a whole a lightweight suspension upright or knuckle (a steering knuckle in the non-limitative embodiment shown) for a vehicle, the latter being not shown for sake of simplicity.

Figures 1, 2:
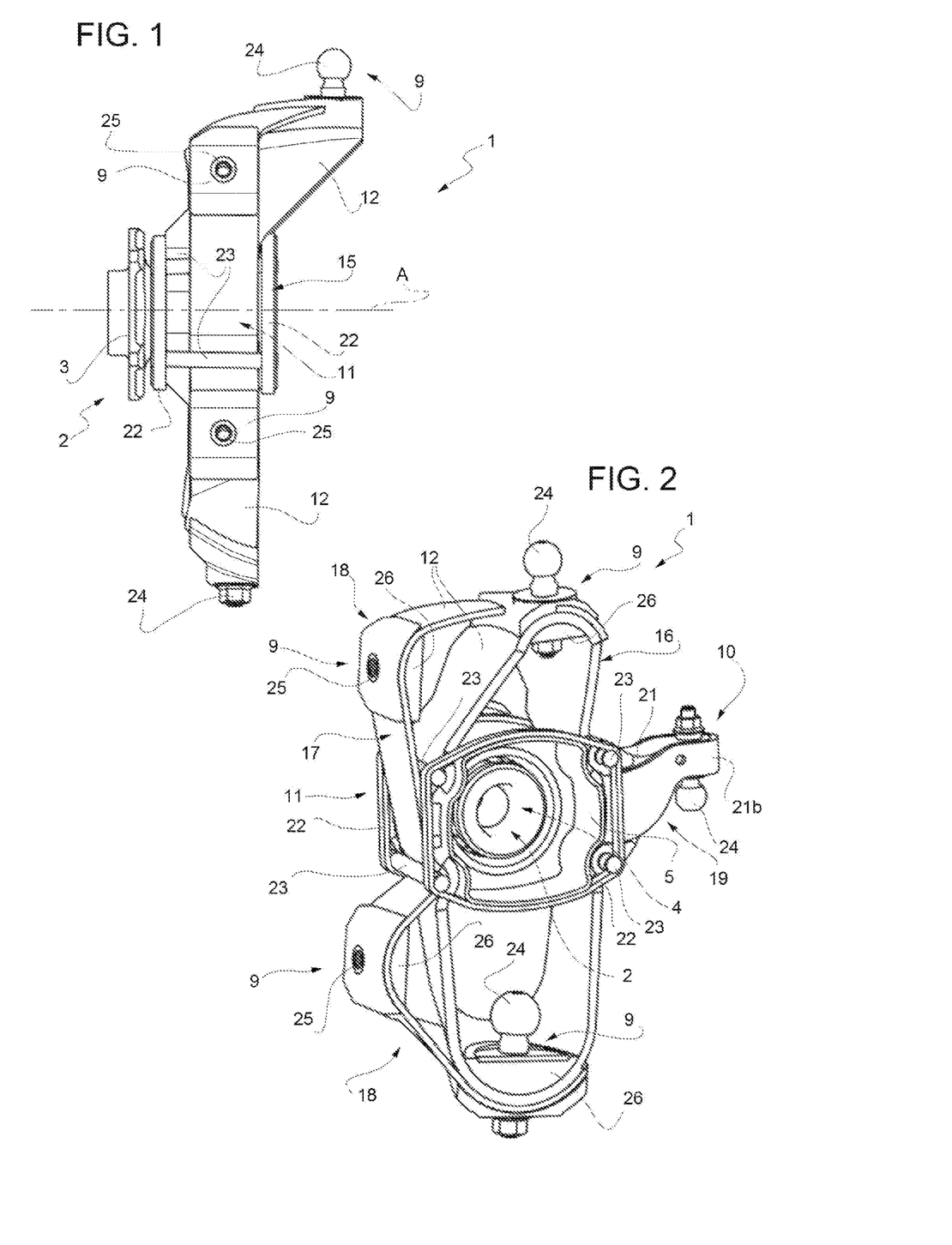
FIG. 1 illustrates in a schematic way an elevation side view of a suspension upright or knuckle according to the invention.
FIG. 2 schematically illustrates a three quarter axonometric view from the rear of the suspension upright or knuckle according to the invention, which includes a hub bearing module.

The lightweight suspension upright or knuckle 1 is represented in a schematic, non-limitative manner only, in order to make clearer the concept on which the invention is based. It is therefore clear that it may have any suitable different shape, so that the invention is not limited in any manner to the specific embodiment shown.

According to one aspect of the invention, the suspension upright or knuckle 1 is made, in a manner that will be described in details herein below, in a composite material, e.g. a fiber reinforced synthetic plastic resin.

Contrary to the teachings of US2016121927A1, however, it is not molded in one piece over a bearing interface constituted by a metallic sleeve.

The suspension upright or steering knuckle 1 comprises in fact a bearing connection interface 2 for receiving a wheel rolling bearing 3, the latter being an HBU (Hub Bearing Unit) well known in the art and accordingly not shown and described in details for sake of simplicity.

The bearing connection interface 2 includes a first sleeve element 4 having a cylindrical shape and an axis of symmetry A (FIG. 1) constituting a first axis of the knuckle 1 and coinciding in use with a rotation and symmetry axis of the wheel bearing 3. In the non-limiting example shown, the first sleeve element 4 is metallic and preferably consists of a steel outer ring of the wheel rolling bearing or HBU 3; the outer ring or first sleeve element 4 is shown in a schematic way only, for sake of simplicity, so e.g. the tracks for the rolling bodies are not shown. Alternatively, the first sleeve element 4 may be configured to receive in known manner, e.g. by interference fitting, the wheel bearing 3 and may be, in this case, made either of a metal alloy or of a fiber reinforced synthetic plastic.

Figure 3A:
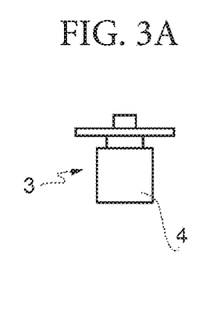
FIGS. 3A-3E and 4F-4I illustrate schematically respective sequential steps of a possible method of manufacturing of a suspension upright or knuckle according to the invention.
Figure 3B:
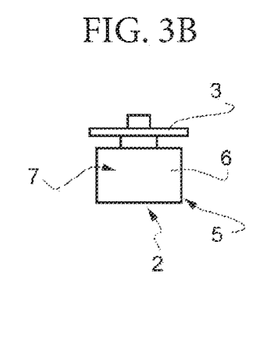
Figure 3C:
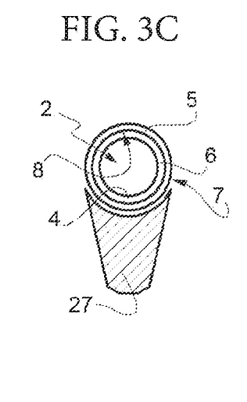

According to one aspect of the invention, the bearing connection interface 2 also comprises a second sleeve element 5 (FIG. 3B) arranged radially outside the first sleeve element 3 and an annular body 6 arranged, in the non-limiting example shown, radially inside the second sleeve element 5; the bearing connection interface 2 has a radially outer lateral surface 7 and a radially inner lateral surface 8 (FIG. 3C).

The annular body 6 is made of a composite material, which, according to a preferred aspect of the invention, is selected from the group consisting of BMC (Bulk Molding Compound), LFT (Long Fiber Thermoplastic) and DLFT (Direct In-Line Long Fiber Thermoplastic).

BMC, as well as LFT/DLFT, are synthetic plastic materials in which individual reinforcing fibers of considerable length (usually ½ inch or 12 mm) are uniformly dispersed within a synthetic plastic matrix without a specific orientation (or oriented by the flow during the compression but never arranged in layers) while, e.g., in SMC materials the fibers are disposed in layers. In BMC materials the synthetic plastic matrix is generally formed by a thermosetting resin and such materials are adapted to be formed, generally, by compression molding; in LFT/DLFT materials the synthetic plastic matrix is formed by a thermoplastic resin and such materials are adapted to be formed by injection molding. Moreover, in both the BMC and LFT materials the reinforcing fibers are of uniform length.

Preferably, in the final, molded material the individual reinforcing fibers form groups of fibers aligned with respect to each other, and the groups are uniformly dispersed randomly in the matrix, in order to give rise to a nearly isotropic or isotropic material.

The annular body 6 is coaxial with the first sleeve element 4.

The radially inner lateral surface 8 is mechanically coupled to the first sleeve element 4 in any know manner, e.g. by chemical and/or mechanical (e.g. by friction) adhesion and/or owing to interlocking mechanical means, known and not shown for sake of simplicity: for example, the outer lateral surface of the first sleeve element 4 is knurled or lettered or otherwise machined using mechanical, chemical or optical processes, such as to create thereon a surface texture and/or it is provided with grooves, ribs or pins which may receive/be embedded in the composite material of the annular body 6.

According to a further and fundamental aspect of the invention, the lightweight suspension upright or knuckle 1 further comprises at least one first attachment interface 9 (four in the non-limitative example shown) and at least one second attachment interface 10, configured to connect in use the suspension upright or knuckle 1 to a respective control or support element therefor, known and not shown for sake of simplicity, and a supporting structural body 11 mechanically connecting the bearing connection interface 2 with the at least one and second attachment interfaces 9,10.

The supporting structural body 11 is made of a fiber reinforced composite material realized in a peculiar and innovative way.

In particular, the supporting structural body 11 is shaped as a reticular frame comprising a plurality of first blade elements 12 chemically and mechanically interconnected to each other, at least one first blade element being also chemically and mechanically directly bound to the outer lateral surface 7 of the annular body 6 of the bearing connection interface 2, so as to join integral in one piece therewith.

Each first blade element 12 consists in one or more plies 13 of continuous fibers embedded in a polymer matrix, which plies 13 are stacked onto one another when the blade elements 12 are formed by more than one plie 13.

According to a feature of the invention the plies 13 forming the first blade elements 12 are configured and arranged such that the continuous fibers contained therein (known and not shown for sake of simplicity) are all contained, i.e. all lie, in planes which are all perpendicular or at least nearly perpendicular to the axis A, i.e. are parallel or nearly parallel to the drawing sheet in FIG. 3.

The fibers of each plie 13 forming the first blade elements 12 are in fact mono-directionally oriented.

To obtain the blade elements 12, as it will be seen, the plies 13 have been compression molded to one another and at least one of the blade elements 12 has been compression molded to the outer surface 7.

In fact, the plies 13 forming the first blade elements 12 are all wound in a ring shape around the annular body 6 of the bearing connection interface 2 and, progressively radially outwards, around one another, as it is schematically illustrated in FIGS. 4F-4I and FIG. 5L, M. In this manner, wound after wound, the plies 13 form progressively radially wider annular layers 14 of continuous fibers embedded in a polymer matrix, each plie 13 having been circumferentially clamped against, and chemically and mechanically bound to, the plie 13 arranged immediately radially inwards to form the blade elements 12 and each blade element 12 is chemically and mechanically bound to any other blade element 12 radially in direct contact therewith to form the supporting structural body 11.

In the non-limiting embodiment of FIGS. 1 and 2, the supporting structural body 11 further comprises a three dimensional, reinforcing frame structure 15, which is arranged radially outside a first ring structure 16 (FIG. 2) defined by one or more first blade elements 12.

The three dimensional, reinforcing frame structure 15 bears partly radially on the inside and partially radially on the outside thereof a second ring structure 17 (FIG. 2) formed by one or more further first blade elements 12 different from those forming the ring structure 16.

The blade element/s 12 defining the ring structure 17 is/are wound onto the frame structure 15 so as to rest therein.

Moreover, the blade element/s 12 defining the ring structure 16 is/are also wound onto the frame structure 15, but solely radially on the inside thereof, so as to be supported thereby.

Figure 8:
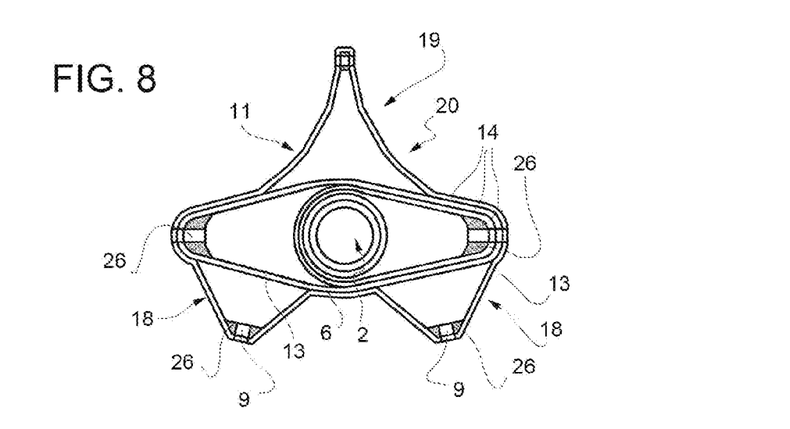
Figure 9:
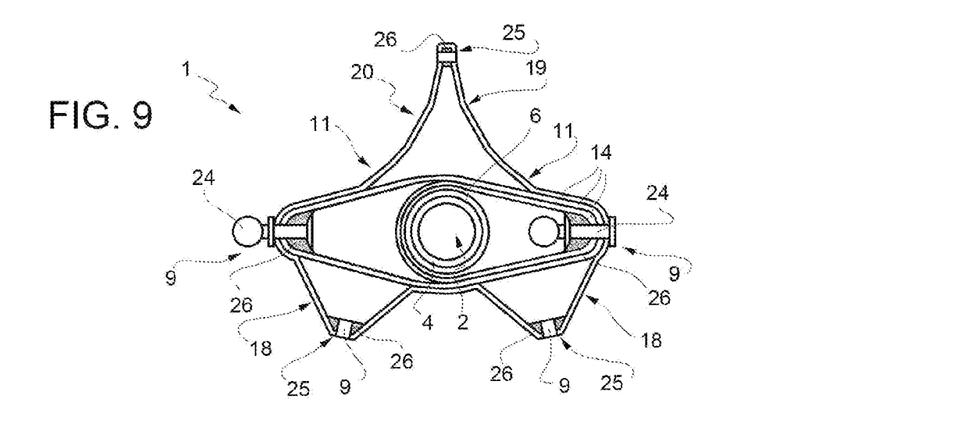
FIG. 9 illustrates schematically an orthogonal front view of the suspension upright or knuckle obtained from the manufacturing steps of figures from 3 to 8.

According to a one preferred embodiment, the first and/or second ring structure 16 and 17 (in the example shown the ring structure 17 only) define respective first radial support arms 18 for the first attachment interfaces 9 and second radial support arms 19 (one single support arm 19 in the embodiment shown) for the second attachment interface 10 (FIGS. 8 and 9).

Preferably, at least one respective support arm 18, 19, in the example shown the arm 19 only, supporting the at least one second attachment interface 10, is formed either by a circumferential section 20 (FIGS. 8 and 9) of the second ring structure 17 or by at least one second blade element 21 (FIGS. 1 and 2) also formed by one or more plies 13 of continuous fibers embedded in a polymer matrix and oriented as the mats or plies of the blade elements 12, and by at least one further second blade element 21b (still formed by one or more plies 13 of continuous fibers embedded in a polymer matrix) arranged at right angle with the plies 13 forming the first blade elements 12.

The three dimensional, reinforcing frame structure 15 comprises (FIGS. 1 and 2) two rings 22, in the non limiting example shown squared, and a plurality of tightening rods 23 arranged parallel to the axis A and engaged radially by the two rings 22, by which they are radially compressed; the first and/or second blade elements 12, 21 forming the radial support arms 18, 19 are at least partially wound upon the rings 22 and/or the tightening rods 23, so as to be supported by them and to be pre-tensioned by them.

Independently of how the arms 18, 19 are obtained, the arms 18 and 19 are configured to radially project in cantilever fashion from the supporting structural body 11, preferably on opposite sides thereof.

The attachment interfaces 9, 10 comprise metallic pins 24 or bushings 25 connected integral with the first blade elements 12 and/or the second blade elements 21.

As it will be seen, the attachment interfaces 9, 10 also comprise cushions 26 made in a BMC/LFT/DLFT composition which are bonded to and are integral part of the blade elements 12, 21 and in which the pins 24 and/or bushing 25 are embedded.

The use of selected composite materials in a specifically selected arrangement, as described above, allows to achieve the highest strength to weight and stiffness to weight ratios, since the fibers of the mats or plies 13 are placed in appropriate directions, depending on the loading condition of the structure. Main loading of the knuckle is generally acting in vertical and transversal direction with respect to car motion, so by placing the fibers in two plane structures (blades) running from lower to upper joints (attachment interfaces 9) for connection with suspension arms and passing on the two sides of the hub bearing unit 3, it is possible to sustain and transmit the main load in a very effective way taking full advantage of the composite material performance.

The described shape allows also to realize an effective connection to the hub bearing unit 3 itself having a large contact surface available, the HBU 3 being hosted in a large diameter composite tube 6 (or similar shape) that allows the transition from the circular shape of bearings 3 to the flat surface of the blades 12, 21. These latter are also particularly effective in easing the connection with upper and lower joints/interfaces 9 as long as by the introduction of specific metallic clamping like pins 24 and bushing 25 an effective load transfer can be obtained.

In a similar way to the main blades 12, lateral blades 12, 21 are put in place to connect the main structure with brake caliper joints and the steering arm joint, respectively. Orientation of these lateral structure is made according to the specific load paths.

As it has been seen, the structures of the blade elements 12, 21 are preferably made in unidirectional (UD) composite material having fibers mainly oriented in the load direction (parallel to the blade direction) to obtain maximum performance of the composite material.

In the embodiment of FIGS. 1 and 2, the sleeve element 5 which is part of the connection interface 2 designed to host the HBU 3 forms a central tube hosting the hub bearing unit 3 and made in UD plies as well, while the material of the annular body 6 also hosted within the tube 5 but packed between the latter and the sleeve 4 connects this "tube" 5 to the outer ring of the bearing 3 and is made in a nearly isotropic composite material like BMC/LFT/DLFT.

The central tube or sleeve 5 is in this embodiment shaped so to allow the four metallic rods 23 to be compressed in the so defined recess. In between the rods 23 and the central tube 5, the main vertical first blades elements 12 are interposed, so allowing the required load transfer between these two structures that cannot be purely based on the resin performance. The four rods 23 are kept in a compressed state with the main central tube/sleeve 5 by mean of the squared rings 22 made by fibers in the rowing or tow form.

The connection of the blade 12 to form the main body 11 is arranged in two ways: one is by mean of the four rods 23 as the main blades 12 and the other one is due to the joints that connect the knuckle 1 to the suspension arms, i.e. in the example shown the attachment interfaces 9.

The knuckle 1 is connected to suspension arms and brake caliper by mean of metallic inserts like pins 24 and bushings 23, which are realized at least in two parts, an inner part and an outer part on the two sides of the blades 12, 21 in composite material they are connected to. The two parts are preferably compressed against an intermediate bulky composite material (like BMC) forming the cushions 26 which is then in direct contact with the surfaces of the blades 12, 21 so to allow the proper load transfer to the laminate and preventing it to fail because of the transversal stresses. The surfaces of these joints are designed so to match the shape of the blade 12, 21. Compression may be obtained by e.g. a screwed connection.

Regarding the steering arm 19, the blade 21 in this case is positioned to have the higher stiffness while solicited in the steering action, so in a transversal direction to the vehicle motion. The composite blade 21 is in this case realized by mean of an additional cleat that enables the transfer of the load to the main blades 12.

From what has been described up to now, it is clear that the present invention also relates to a method for obtaining a lightweight suspension upright or knuckle 1 for a vehicle comprising a bearing connection interface 2 for receiving a wheel bearing, the bearing connection interface including a first sleeve element 4. Such method comprises, not necessarily in sequence, the steps of:

i)—providing the bearing connection interface 2 with a second sleeve element 5 arranged radially outside the first sleeve element 4 and comprising an annular body 6, having a radially outer lateral surface 7 and a radially inner lateral surface 8, the annular body 6 being formed by injection or compression molding a composite material selected from the group consisting of BMC (Bulk Molding Compound) and LFT (Long Fiber Thermoplastic) and DLFT (Direct Long Fiber Thermoplastic) directly upon a radially outer lateral surface of the first sleeve element 4 so as to mechanically couple the second sleeve element 5 to the first sleeve element 4;

ii)—forming around the annular body 6 a supporting structural body 11 shaped as a reticular frame by coupling together and with the annular body 6 at least a plurality of first blade elements 12, each first blade 12 element consisting in one or more plies 13 of continuous fibers embedded in a polymer matrix, which plies 13 are stacked onto one another when the first blade elements 12 are formed by more than one plie 13;

iii)—compression molding the plies 13 against one another and onto the second sleeve element 5 and/or the annular body 6 thereof pertaining to the bearing connection interface 2 up to completely cure the plies 13 so as to chemically and mechanically interconnect them to each other and also chemically and mechanically directly bound at least one first blade element 12 to the outer lateral surface 7 of the bearing connection interface 2;

iv)—applying to selected portions of at least some of the first blade elements 12 at least one first and one second attachment interface 9,10 configured to connect in use the suspension upright or knuckle 1 to respective control or support elements therefor, so as to make the bearing connection interface 2 integral with the at least one first and one second attachment interface 9,10 via the supporting structural body 11.

The continuous fibers of the plies 13 forming the first blade elements 12 are arranged such that they are all contained in planes which are all essentially perpendicular to a first axis of symmetry A of the first sleeve element 4.

Figure 3D:
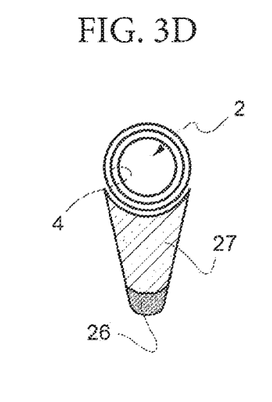
Figure 3E:
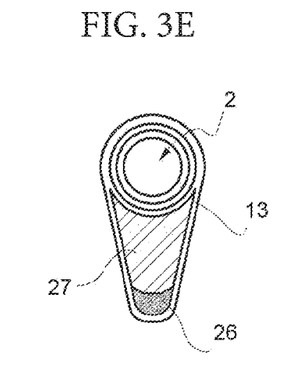
Figure 4F:
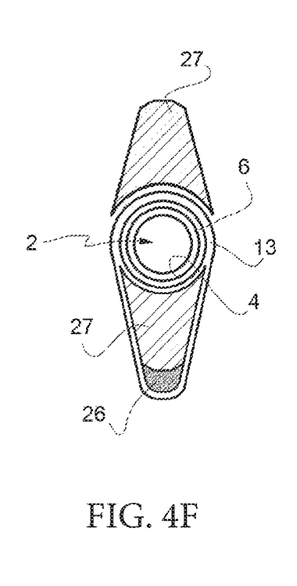
Figure 4G:
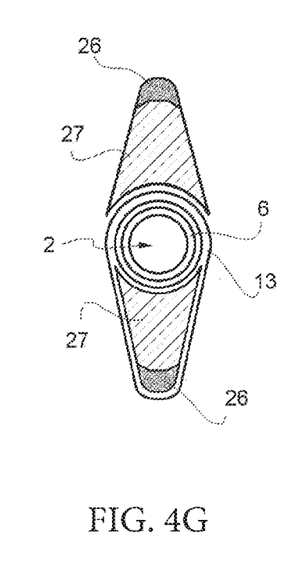
Figure 4H:
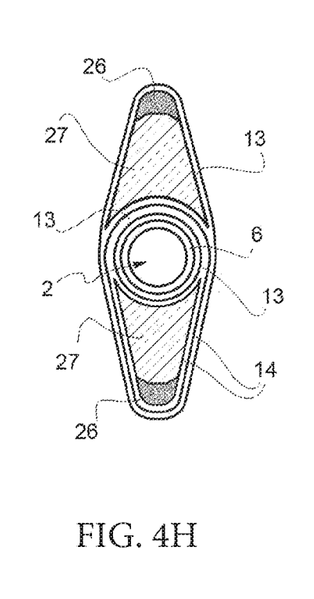
Figure 4I:
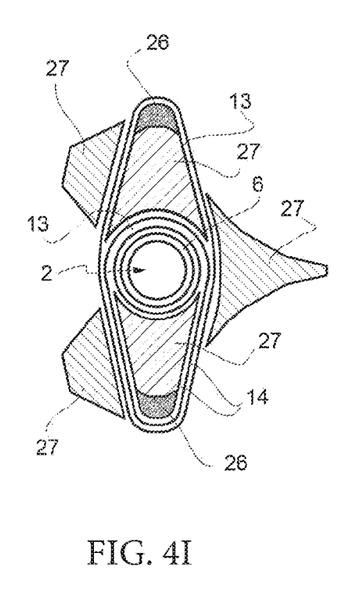
Figure 5L:
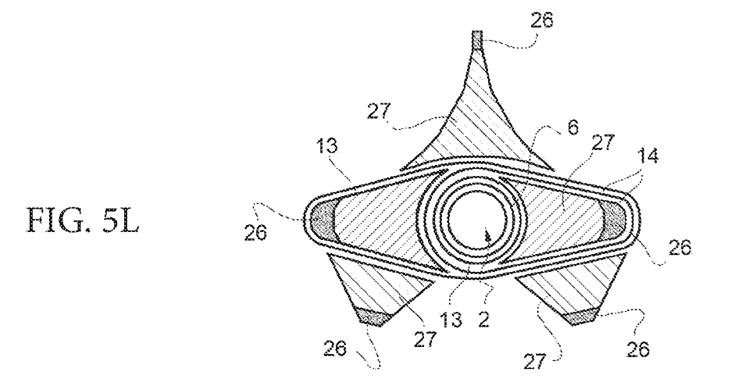
FIGS. 5M and 5L illustrate schematically further respective manufacturing step a suspension upright or knuckle according to the invention.
Figure 5M:
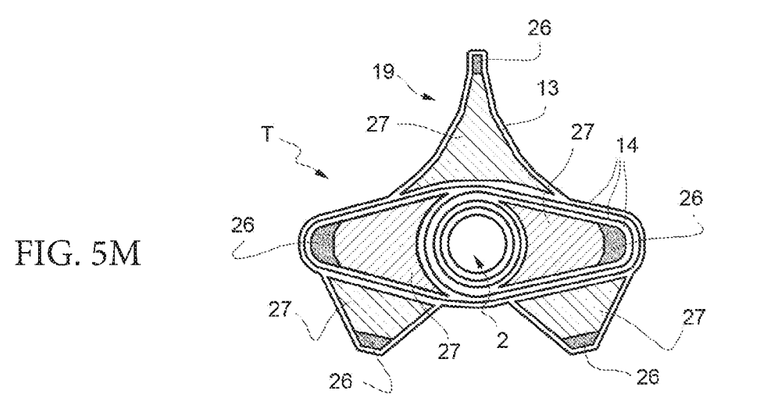

Moreover, as schematically shown in FIGS. 3-5, the above steps are carried out so that the plies 13 forming the first blade elements 12 when in a non-cured or only partially cured state are wound in a ring shape, one after the other, in sequence, around the annular body 6/second sleeve element 5 of the bearing connection interface 2 and, progressively radially outwards, around one another, by using a plurality of core templates 27 (FIGS. 3-5) to support the plies 13, which in that state are not self-supporting, such as to form progressively radially wider annular layers 14 of continuous fibers embedded in a polymer matrix, each plie 13 being circumferentially clamped against the plie 13 arranged immediately radially inwards and against the core templates 27 and the annular body 6/sleeve element 5 of the bearing connection interface 2.

Following the sequence shown in FIGS. 3-6, firstly it is formed a unit joining the wheel bearing 3 with the connection interface 2, e.g. by molding directly upon the sleeve element 4 the annular body 6 and/or the sleeve element 5, which are however kept preferably in a non-completely cured state (FIGS. 3A-B).

Then a first template 27 is arranged radially outside the connection interface 2 so formed, and an eventual cushion 26 is arranged upon a radially outer end of the template 27; then a first plie 13 is strictly wound around the bearing connection interface 2, so as to be in contact with surface 7, and the template 27; in this manner, the template 27 is also blocked against the surface 7 (FIGS. 3D-E).

Thereafter, a second template 27, e.g. identical to the first, is arranged against the first plie 13 on the opposite side of the first template 27, it receives a further cushion 26 on its free radial end, and a second plie 13 is strictly wound around and against such second template 27 and the first plie 13, in direct contact therewith, so also blocking the second template 27 in position (FIGS. 4F-H).

At this point further template 27 of different shape are arranged radially outside the second plie 13 (FIG. 4I) and radially projecting therefrom, and receive on their free radial ends further cushions 26 (FIG. 5L) and then a third plie 13 is strictly wound around and against the further templates 27 and the first and second plies 13 (FIG. 5M) so also blocking the further templates 27 in position.

Figure 6:
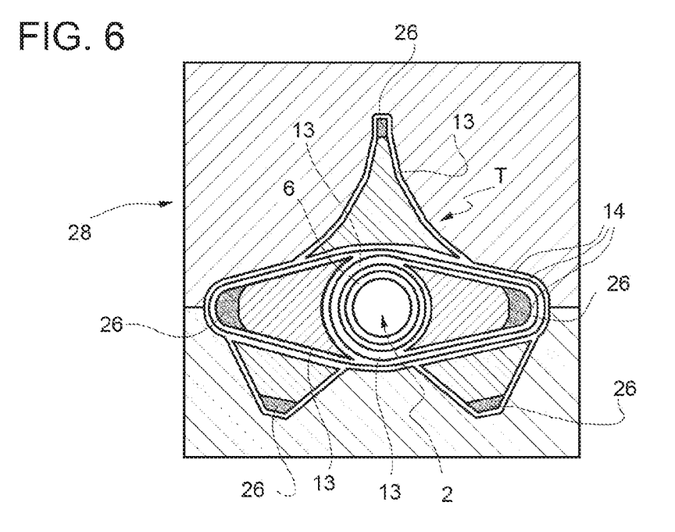
FIG. 6 illustrates schematically a compression molding manufacturing step of a suspension upright or knuckle according to the invention.

At this point a self-supporting composite structure T is obtained, wherein the template 27 are all arranged parallel to axis A. Such structure T is placed in a mold 28 and the plies 13, as well as the incompletely cured components of the connection interface 2 (body 6 and/or sleeve 5) are compression molded and completely cured, so as to become rigid. This completes the compression molding step.

Figure 7:
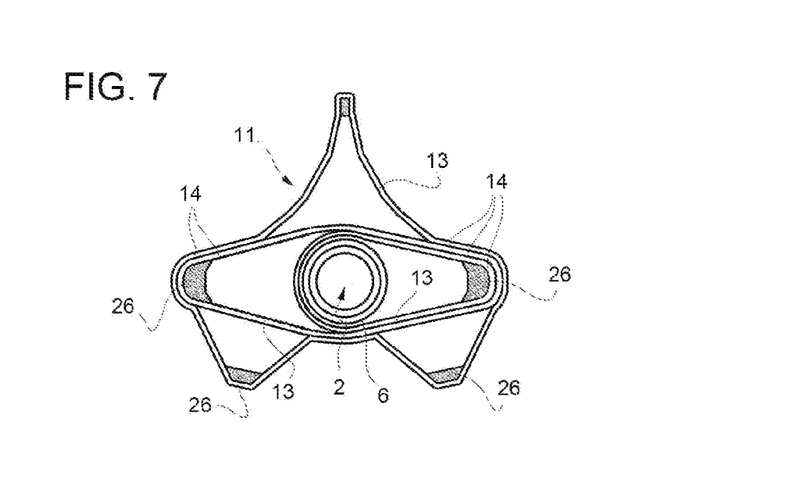
FIGS. 7 and 8 illustrate, respectively, a semi-finished product coming from the compression molding step of FIG. 6 and a final, finishing, manufacturing step of a suspension upright or knuckle according to the invention.

Thereafter, the mold 28 is opened and the core templates 27 are removed in the direction of the first axis A after the end of the compression molding step, so leaving a finished reticular body 11 (FIG. 7).

Thereafter, holes may be provided to complete the attachment interfaces 9, 10 (FIG. 8) and the pins 24 and bushing 25 are arranged in place. The knuckle 1 is so completed.

Of course, the attachment interfaces 9, 10 may be obtained in a different manner, e.g. the pins 24 and/or bushing 25 may be co-molded with the cushions 26 and the mats or plies 13. Preferably, as previously described, the metallic clamping 24, 25 may be formed in two parts screwed together.

From the above, it is clear that the suspension uptight/knuckle 1 described is relatively simple and economic to be obtained, extremely light and performant. Moreover, it may be shaped according to the necessity in a simple manner.

All the objects of the invention are therefore achieved.

What is claimed is:

1. A lightweight suspension upright or knuckle for a vehicle, comprising:
   i) a bearing connection interface for receiving a wheel bearing, the bearing connection interface including a first sleeve element having a first axis (A), the first axis coinciding in with a rotation and symmetry axis of the wheel bearing;
   ii) at least one first and one second attachment interface configured to connect the suspension upright or knuckle to a respective control or support element therefor; and
   iii) a supporting structural body mechanically connecting the bearing connection interface with the at least one first and second attachment interface, the supporting structural body being made of a fiber reinforced composite material, wherein
   iv) the bearing connection interface also comprises a second sleeve element arranged radially outside the first sleeve element and an annular body, having a radially outer lateral surface and a radially inner lateral surface, at least the annular body being made of a composite material including reinforcing fibers dispersed in a polymer matrix, the radially inner lateral surface (8) being mechanically coupled to the first sleeve element;
   v) the supporting structural body being shaped as a reticular frame comprising a plurality of first blade elements chemically and mechanically interconnected to each other, at least one first blade element being also chemically and mechanically directly bound to the outer lateral surface of the bearing connection interface, so as to integrally join the at least one first blade element and the outer lateral surface into a single piece;
   vi) each first blade element consisting of one or more plies of continuous fibers embedded in a polymer matrix that are stacked onto one another when the blade elements are formed by more than one mat or plie;
   wherein the annular body is made of a composite material selected from the group consisting of BMC (Bulk Molding Compound), LFT (Long Fiber Thermoplastic) and DLFT (Direct In-Line Long Fiber Thermoplastic), and in that the continuous fibers of the plies forming the first blade elements are at least in part contained in planes which are essentially perpendicular to the first axis (A).

2. A lightweight suspension upright or knuckle for a vehicle, comprising:
  i) a bearing connection interface for receiving a wheel bearing, the bearing connection interface including a first sleeve element having a first axis (A), the first axis coinciding in with a rotation and symmetry axis of the wheel bearing;
  ii) at least one first and one second attachment interface configured to connect the suspension upright or knuckle to a respective control or support element therefor; and
  iii) a supporting structural body mechanically connecting the bearing connection interface with the at least one first and second attachment interface, the supporting structural body being made of a fiber reinforced composite material, wherein
  iv) the bearing connection interface also comprises a second sleeve element arranged radially outside the first sleeve element and an annular body, having a radially outer lateral surface and a radially inner lateral surface, at least the annular body being made of a composite material including reinforcing fibers dispersed in a polymer matrix, the radially inner lateral surface (8) being mechanically coupled to the first sleeve element;
  v) the supporting structural body being shaped as a reticular frame comprising a plurality of first blade elements chemically and mechanically interconnected to each other, at least one first blade element being also chemically and mechanically directly bound to the outer lateral surface of the bearing connection interface, so as to integrally join the at least one first blade element and the outer lateral surface into a single piece;
  vi) each first blade element consisting of one or more plies of continuous fibers embedded in a polymer matrix that are stacked onto one another when the blade elements are formed by more than one mat or plie;
  wherein the fibers of each plie forming the first blade elements are mono-directionally oriented; the plies having been compression molded to one another to obtain the blade elements and at least one of the blade elements having been compression molded to the outer surface of the connection interface.

3. A lightweight suspension upright or knuckle for a vehicle, comprising:
  i) a bearing connection interface for receiving a wheel bearing, the bearing connection interface including a first sleeve element having a first axis (A), the first axis coinciding in with a rotation and symmetry axis of the wheel bearing;
  ii) at least one first and one second attachment interface configured to connect the suspension upright or knuckle to a respective control or support element therefor; and
  iii) a supporting structural body mechanically connecting the bearing connection interface with the at least one first and second attachment interface, the supporting structural body being made of a fiber reinforced composite material, wherein
  iv) the bearing connection interface also comprises a second sleeve element arranged radially outside the first sleeve element and an annular body, having a radially outer lateral surface and a radially inner lateral surface, at least the annular body being made of a composite material including reinforcing fibers dispersed in a polymer matrix, the radially inner lateral surface (8) being mechanically coupled to the first sleeve element;
  v) the supporting structural body being shaped as a reticular frame comprising a plurality of first blade elements chemically and mechanically interconnected to each other, at least one first blade element being also chemically and mechanically directly bound to the outer lateral surface of the bearing connection interface, so as to integrally join the at least one first blade element and the outer lateral surface into a single piece;
  vi) each first blade element consisting of one or more plies of continuous fibers embedded in a polymer matrix that are stacked onto one another when the blade elements are formed by more than one mat or plie;
  wherein the plies forming the first blade elements are all wound in a ring shape around the bearing connection interface and, progressively radially outwards, around one another, such as to form progressively radially wider annular layers of continuous fibers embedded in a polymer matrix, each mat or plie being circumferentially clamped against the mat or plie arranged immediately radially inwards.

4. A lightweight suspension upright or knuckle for a vehicle, comprising:
  i) a bearing connection interface for receiving a wheel bearing, the bearing connection interface including a first sleeve element having a first axis (A), the first axis coinciding in with a rotation and symmetry axis of the wheel bearing;
  ii) at least one first and one second attachment interface configured to connect the suspension upright or knuckle to a respective control or support element therefor; and
  iii) a supporting structural body mechanically connecting the bearing connection interface with the at least one first and second attachment interface, the supporting structural body being made of a fiber reinforced composite material, wherein
  iv) the bearing connection interface also comprises a second sleeve element arranged radially outside the first sleeve element and an annular body, having a radially outer lateral surface and a radially inner lateral surface, at least the annular body being made of a composite material including reinforcing fibers dispersed in a polymer matrix, the radially inner lateral surface (8) being mechanically coupled to the first sleeve element;
  v) the supporting structural body being shaped as a reticular frame comprising a plurality of first blade elements chemically and mechanically interconnected to each other, at least one first blade element being also chemically and mechanically directly bound to the outer lateral surface of the bearing connection interface, so as to integrally join the at least one first blade element and the outer lateral surface into a single piece;
  vi) each first blade element consisting of one or more plies of continuous fibers embedded in a polymer matrix that are stacked onto one another when the blade elements are formed by more than one mat or plie;
  wherein the supporting structural body further comprises a three dimensional, reinforcing frame structure arranged radially outside a first ring structure defined by one or more first blade elements and bearing partly radially on the inside and partially radially on the outside thereof a second ring structure formed by one or more further first blade elements wound onto the frame structure; the first and second ring structure defining respective radial support arms for the first and second attachment interfaces, radially projecting in cantilever fashion from the supporting structural body.

5. The lightweight suspension upright or knuckle according to claim 4, wherein at least one respective support arm for at least one second attachment interface is formed either by a circumferential section of the second ring structure or by at least one second blade element also formed by one or more plies of continuous fibers embedded in a polymer matrix and oriented as the plies of the first blade elements, and by at least one further second blade element still formed by one or more plies of continuous fibers embedded in a polymer matrix but arranged at right angle with the plies forming the first blade elements.

6. The lightweight suspension upright or knuckle according to claim 5, wherein the three dimensional, reinforcing frame structure comprises two rings and a plurality of tightening rods arranged parallel to the first axis (A) and engaged by the two rings; the first and/or second blade elements forming the radial support arms being at least partially wound upon the rings and/or the tightening rods, which are configured to pre-tension the plies.

7. A lightweight suspension upright or knuckle for a vehicle, comprising:
   i) a bearing connection interface for receiving a wheel bearing, the bearing connection interface including a first sleeve element having a first axis (A), the first axis coinciding in with a rotation and symmetry axis of the wheel bearing;
   ii) at least one first and one second attachment interface configured to connect the suspension upright or knuckle to a respective control or support element therefor; and
   iii) a supporting structural body mechanically connecting the bearing connection interface with the at least one first and second attachment interface, the supporting structural body being made of a fiber reinforced composite material, wherein
   iv) the bearing connection interface also comprises a second sleeve element arranged radially outside the first sleeve element and an annular body, having a radially outer lateral surface and a radially inner lateral surface, at least the annular body being made of a composite material including reinforcing fibers dispersed in a polymer matrix, the radially inner lateral surface (8) being mechanically coupled to the first sleeve element;
   v) the supporting structural body being shaped as a reticular frame comprising a plurality of first blade elements chemically and mechanically interconnected to each other, at least one first blade element being also chemically and mechanically directly bound to the outer lateral surface of the bearing connection interface, so as to integrally join the at least one first blade element and the outer lateral surface into a single piece;
   vi) each first blade element consisting of one or more plies of continuous fibers embedded in a polymer matrix that are stacked onto one another when the blade elements are formed by more than one mat or plie;
   wherein the attachment interfaces comprise metallic pins or bushings connected integral with the first blade elements.

8. A method for obtaining a lightweight suspension upright or knuckle for a vehicle providing a bearing connection interface for receiving a wheel bearing, the bearing connection interface including a first sleeve element; the method comprising the steps of:
   i) providing the bearing connection interface with a second sleeve element arranged radially outside the first sleeve element and with an annular body, the bearing connection interface having a radially outer lateral surface and a radially inner lateral surface, the annular body being formed by injection or compression molding a composite material including reinforcing fibers dispersed in a polymer matrix directly upon a radially outer lateral surface of the first sleeve element so as to mechanically couple the second sleeve element to the first sleeve element;
   ii) forming around the annular body a supporting structural body shaped as a reticular frame by coupling together and with the annular body at least a plurality of first blade elements, each first blade element consisting in one or more plies of continuous fibers embedded in a polymer matrix, which plies are stacked onto one another when the first blade elements are formed by more than one plie,
   iii) compression molding the plies against one another and onto the bearing connection interface up to completely cure the plies so as to chemically and mechanically interconnect them to each other and also chemically and mechanically directly bound at least one first blade element to the outer lateral surface of the bearing connection interface;
   iv) applying to selected portions of at least some of the first blade elements at least one first and one second attachment interface configured to connect in use the suspension upright or knuckle to respective control or support elements therefor, so as to make the bearing connection interface integral with the at least one first and one second attachment interface via the supporting structural body.

9. The method according to claim 8, wherein the continuous fibers of the plies forming the first blade elements are arranged such that at least some of them are all contained in planes that are perpendicular to a first axis of symmetry (A) of the first sleeve element; the annular body being formed by a composite material selected from the group consisting of BMC (Bulk Molding Compound), LFT (Long Fiber Thermoplastic) and DLFT (Direct Long Fiber Thermoplastic); the plies forming the first blade elements when in a non-cured or only partially cured state being wound in a ring shape, one after the other, around the annular body and the bearing connection interface and, progressively radially outwards, around one another, by using a plurality of core templates to support the plies, such as to form progressively radially wider annular layers of continuous fibers embedded in a polymer matrix, each plie being circumferentially clamped against the plie arranged immediately radially inwards and against the core templates and the bearing connection interface; the core templates being removed in the direction of the first axis (A) after the end of the compression molding step.

* * * * *